Oct. 29, 1929.　　　　C. H. NEHLS　　　　1,733,357
TIRE CARRIER
Filed Jan. 30, 1928　　　2 Sheets-Sheet 1

INVENTOR.
Charles H. Nehls
BY
ATTORNEYS

Oct. 29, 1929.  C. H. NEHLS  1,733,357
TIRE CARRIER
Filed Jan. 30, 1928   2 Sheets-Sheet 2
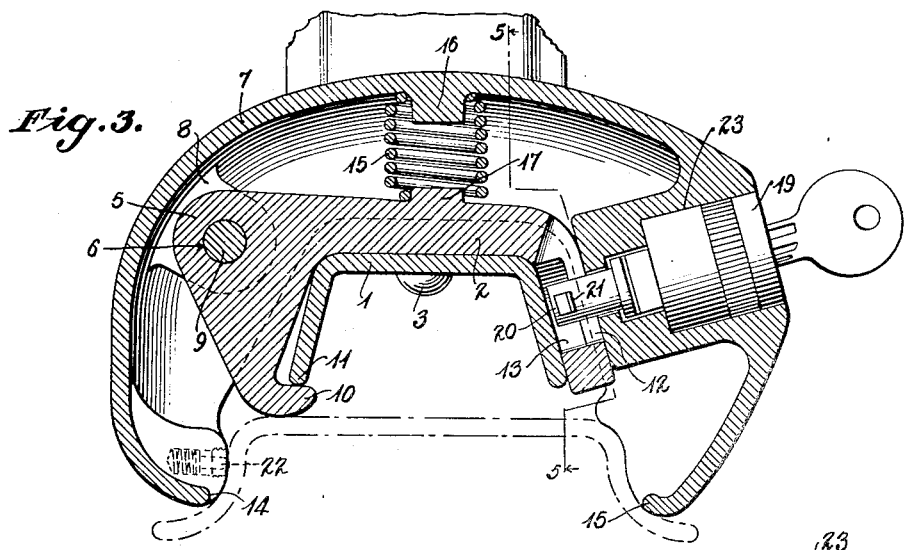
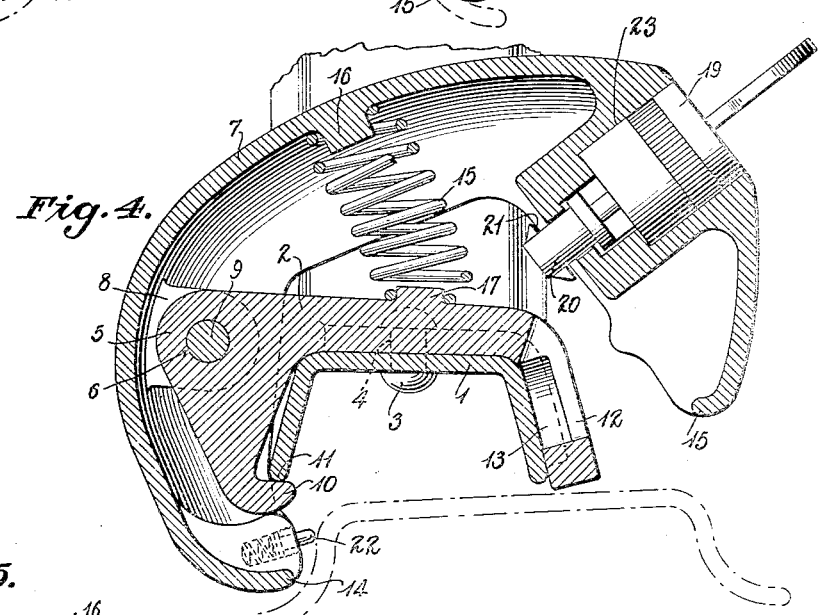
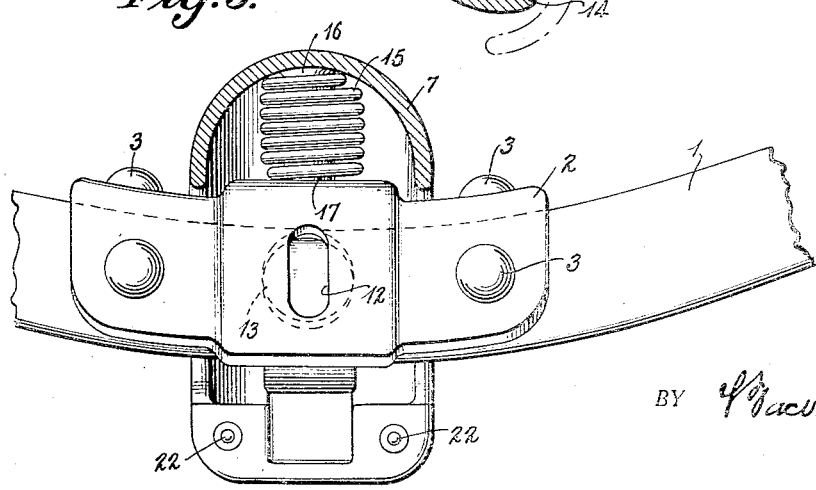
INVENTOR.
Charles H. Nehls
BY
ATTORNEYS Patented Oct. 29, 1929

1,733,357

UNITED STATES PATENT OFFICE

CHARLES H. NEHLS, OF INDIANAPOLIS, INDIANA, ASSIGNOR, BY MESNE ASSIGNMENTS, TO HOUDAILLE-HERSHEY CORPORATION, OF DETROIT, MICHIGAN, A CORPORATION OF MICHIGAN

TIRE CARRIER

Application filed January 30, 1928. Serial No. 250,578.

This invention relates to tire carriers.

The primary object of the invention is to provide a one-piece unitary locking arrangement which may be applied to tire carriers of varying characters and which obviates the use of a wrench or the possibility of losing any of the parts of the apparatus.

The invention further comprehends the idea of providing a clamp which is actuated for locking or unlocking the rim by the operation of placing on or removing the tire and rim from the carrier.

Another feature of the invention is to pivotally mount the clamp to the bracket with an interposed spring therebetween tending to normally maintain the clamp in separated or in inoperative position while the rim and tire are removed, thus eliminating the necessity of holding the clamp when replacing the tire and rim.

Another object of the invention is to provide the clamp with a spring pressed plunger or plungers engaging the rim when in operative position to prevent rattles between the rim and the clamp housing.

There are numerous other objects of the invention which will be apparent to those skilled in the art from a reading of the following specification in conjunction with the drawings attached hereto and forming a part hereof in which Fig. 1 is an elevation of the preferable form of carrier with the lock attached thereto;

Fig. 3 is a cross section through the locking unit in its operative position;

Fig. 4 is a cross section showing the inoperative position of the unit; and

Fig. 5 is a detailed view partly in section.

Figure 1:
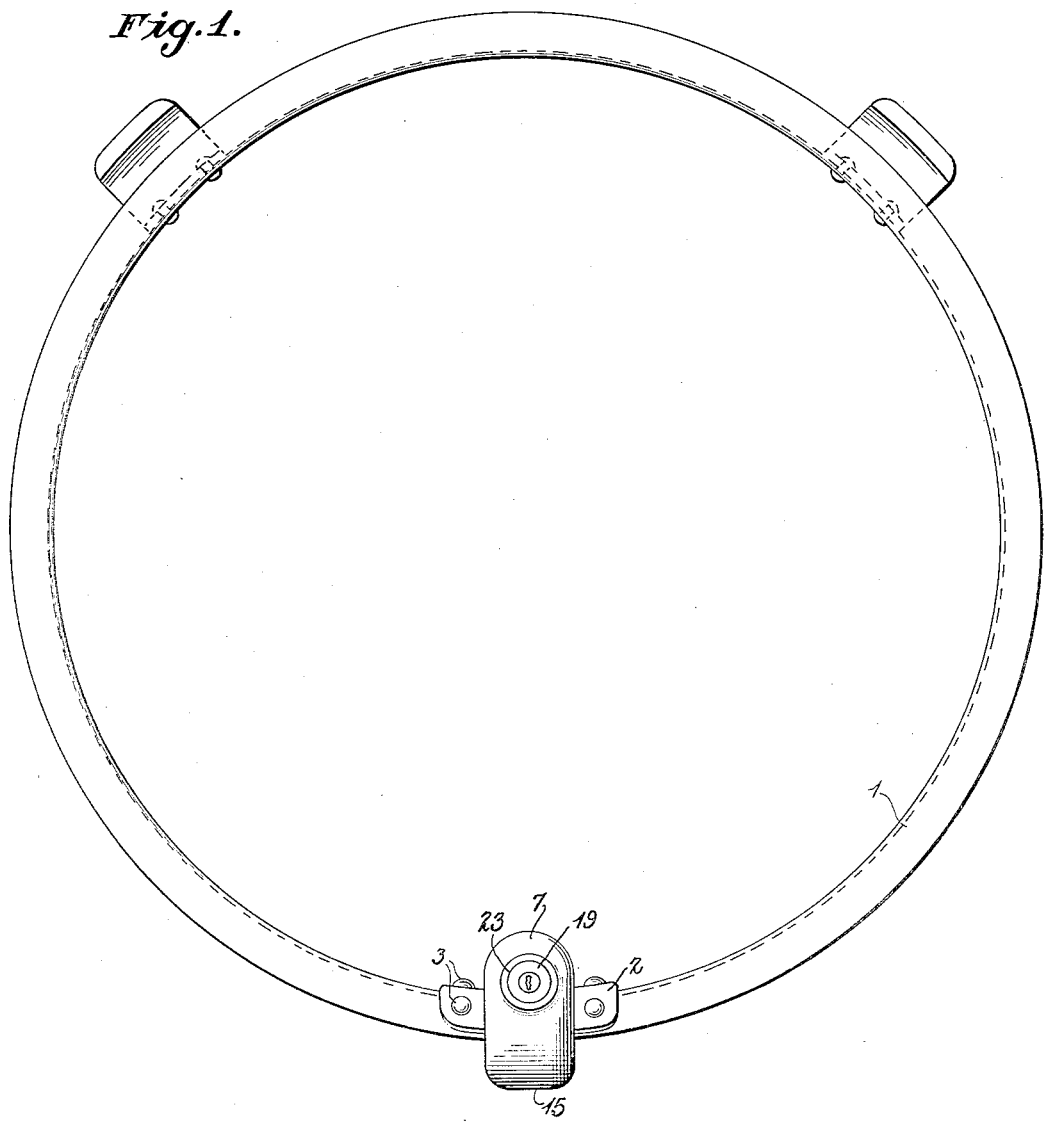
Figure 2:
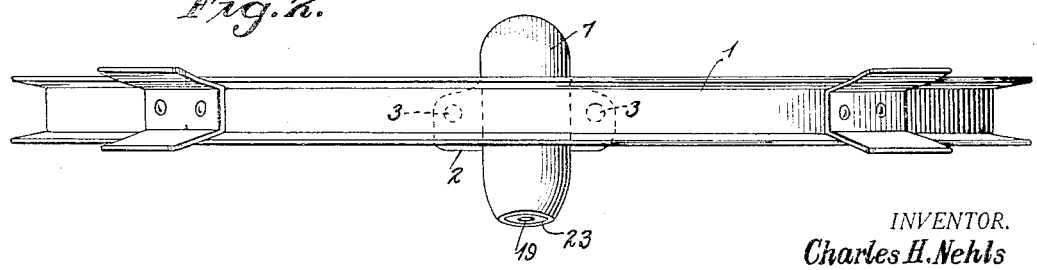
Fig. 2 is a top view thereof.

Referring now specifically to the drawings, the reference numeral 1 indicates a tire carrier of the ring type. Preferably, though not necessarily, this tire carrier is of channel chaped formation in cross section. 2 is a bracket riveted at any desired place to the rim by the rivets 3. For this purpose the bracket is provided with a number of rivet holes 4. Obviously, however, the bracket can be secured to the tire carrier in any other desired manner or can be integral therewith without departing from the spirit of the invention. This bracket has a laterally extending ear 5 with a pintle opening 6 therein. The clamp housing 7 has a recess 8 for pivotally mounting the ear thereto by means of the pintle 9. A hook 10, integral with the bracket, engages the edge of the channel tire carrier as at 11. The adjacent side of the bracket has an elongated slot 12 connecting with the recess 13 for the purpose hereinafter described.

The clamp housing 7, pivotally secured with respect to the bracket 2, at the side thereof, has rim engaging portions 13 and 14. Interposed between the housing and the bracket respectively is a spring 15 centered by lugs 16 and 17 respectively formed integral with the bracket and housing. Obviously, the spring tends to rock the clamp housing in an inoperative position as shown in Fig. 3 as soon as the rim and tire have been shifted laterally to an extent sufficient to permit the outward rocking movement of the clamp housing. In order to secure the clamp in its operative position, I provide a locking assembly 19, key actuated, and having a substantially T-shaped bolt 20, which, in vertical position, gains entrance to the elongated slot 12 aforesaid in the bracket, after which a turning movement thereof by the key will secure the bolt behind the shoulders 21 and within the confines of the recess 13. This particular form of T-bolt, however, is not necessarily employed as the lock may be designed to utilize a spring or snap plunger, automatically causing the engagement of the plunger within the recess upon the application of the rim to the carrier. In this event a key would be required merely to unlock the housing but would not be required to lock the housing to the bracket, this being automatically accomplished by the spring or snap lock upon a downward swinging movement of the clamp into engagement with the bracket.

In order to prevent rattle, I provide one or more spring-pressed plungers 22 secured to the clamp and engaging the side bead of the rim.

From the foregoing, it will be obvious that the one-piece unit is adapted to be actuated for locking or unlocking by the action of placing or removing the tire and rim from the carrier. The large spring interposed between the bracket and clamp housing keeps the latter in open position while the tire and rim are removed, this eliminating the holding of this piece when replacing the tire and rim. The invention also eliminates the use of a wrench, and the possibility of losing any of the loose pieces, as the only removable element to the assembly is the key. As above stated, the T-shaped plungers of the lock may be substituted by a spring or snap lock operable to automatically engage and be retained by the bracket when pushed into its operative position. The clamp housing is of channel shaped formation and encloses a bracket secured to the carrier, thus obviating any possibility of surreptitious removal. It will be observed that the channel shaped clamp housing has a recess 23 therein for receiving the rotary tumbler locking unit.

Having thus described my invention, what I claim is:

1. A tire carrier comprising a supporting ring, a bracket secured thereto, a housing having rim engaging portions associated therewith, means for pivotally securing the housing to the bracket, a spring interposed between the housing and bracket operative to normally urge the housing in its lifted inoperative position, said housing being adapted to be automatically lowered into operative position by the action of placing the rim on the carrier.

2. A tire carrier comprising a supporting ring, a bracket secured thereto, a housing having rim engaging portions associated therewith, means for pivotally securing the housing to the bracket, a spring interposed between the housing and bracket operative to normally urge the housing in its lifted inoperative position, said housing being adapted to be automatically lowered into operative position by the action of placing the rim on the carrier, and means for locking the housing to the bracket.

3. A unit locking assemblage for tire carriers comprising a housing having rim engaging portions, means for rockably securing the housing to the carrier, said housing being adapted to be rocked into operative position, and means for locking the housing to the carrier with its rim engaging portions in contact with the supported rim.

4. A unitary clamping assemblage adapted for attachment to a tire carrier comprising a bracket to be secured to the carrier, a clamp housing pivoted at one side of the bracket, means for yieldably urging the clamp housing in its upright position, said clamp housing being lowered against said means by the application of the rim to the carrier, and means for locking the housing in its operative position.

5. A unit locking assemblage for tire carriers of automobiles having a bracket adapted to be secured to the carrier, a rockable clamp housing having rim engaging portions pivotally secured to the bracket at one side thereof, means for locking the adjacent side of the housing into operative position with respect to the supported rim, and means for automatically rocking the housing into inoperative position upon the removal of the rim from the carrier.

6. A spare tire carrier for automobiles including a supporting element, a bracket rigidly secured thereto, a clamping device for the supported rim pivotally secured to the bracket and adapted for lateral rocking movement relatively to the carrier, and means for locking the clamping device in its operative position.

7. A spare tire carrier for automobiles including a supporting element, a bracket rigidly secured thereto, a clamping device for the supported rim pivotally secured to the bracket and adapted for lateral rocking movement relatively to the carrier, means for locking the clamping device in its operative position, and yieldable means serving to rock the clamp into inoperative position upon the release of the locking device.

8. A tire carrier for automobiles including a supporting device for carrying spare rims and tire, a bracket rigidly secured thereto, a clamp housing substantially enclosing the bracket and pivotally secured thereto for permitting rocking movement of the clamp relative to the carrier, said clamp having rim engaging portions for securing the rim to the carrier, and means for locking the clamp housing into its operative position.

9. A unitary locking assemblage adapted to be applied to spare tire carriers including a bracket for attachment to the carrier, a clamp housing having rim engaging portions for the supported rim, a pivotal connection between the housing and carrier permitting lateral rocking movement of the housing relative to the bracket, said housing being shaped to substantially enclose the bracket to prevent unauthorized access thereto, and means for locking the housing in its operative position.

10. A locking assemblage for attachment to spare tire carriers comprising a rockable clamp housing having rim engaging portions, means for rocking the housing into operative position by the application of the spare rim to the carrier, and means for automatically locking the housing in such position.

11. A locking assemblage adapted for attachment to spare tire carriers comprising a bracket for rigid attachment to the carrier, said bracket having a laterally extending ear, a clamp housing of generally channel-shaped formation in cross section constructed to pivotally receive said ear, a spring interposed between the bracket and housing tending to urge the housing in lifted inoperative position, said housing having rim engaging portions, and means for locking the housing relatively to the carrier to prevent unauthorized removal of the supported rim.

12. A locking assemblage for attachment to a tire carrier for automobiles including a bracket for rigid attachment to the carrier, having a laterally extending ear, a clamp housing having rim engaging portions and shaped to substantially enclose the bracket and pivotally secured to the bracket to permit rocking action of the housing relative thereto, one of the rim engaging portions of the housing having a spring pressed plunger therein preventing rattle of the carrier, and means for locking the housing to the bracket when in its operative position.

13. A tire carrier comprising a ring for supporting a spare rim and tire, said carrier having rim engaging means at the upper half of the circumference thereof, and clamping means at the lower end of the ring rockably disposed relative thereto, said clamping means being adapted to be rocked into operative position by the action of swinging the supported rim inwardly into engagement therewith.

14. A locking assemblege adapted for attachment, as a unit, to a spare tire carrier including a bracket shaped to substantially surround the carrier, a clamp housing having rim engaging portions, said clamp housing being of substantially channel shaped formation and enclosing the bracket at the point of its attachment to the carrier, means for permitting rocking action of the housing relative to the bracket, a spring interposed between the bracket and housing, means for locking to the bracket, said spring functioning to automatically rock the housing into inoperative position upon the release of the locking device.

15. A locking assemblage adapted for attachment as a unit to a tire carrier including a bracket for rigid attachment to the carrier and having a hook portion engaging the carrier and a laterally extending ear, a clamp housing rockably secured to the ear and terminating at its ends in rim engaging portions, said housing being of substantially channel shaped formation and enclosing the ear of the bracket, yieldable means interposed between the bracket and the housing, a lock, a recess in the adjacent side of the bracket receiving the lock and maintaining the housing in its operative position, said yieldable means serving to automatically rock the housing laterally with respect to the bracket upon the release of the locking means.

16. A locking assemblage for attachment to an automobile tire carrier comprising rim clamping means, said rim clamping means being rockably disposed with respect to the carrier, and means adapted to automatically rock the clamp into operative position upon the application of the rim to the carrier, and a locking device securing the clamp in its operative position.

17. A spare tire and rim carrier for automobiles comprising a supporting element having seating portions at the upper circumference thereof for swingingly receiving a supported rim, clamping means at the lower part of the carrier, said clamping means being rendered operative automatically by the swinging action of the rim relative to the carrier, means for locking the clamping means in operative position, said clamping means being rendered automatically inoperative by the release of the locking device.

18. A locking unit adapted for attachment to a tire carrier comprising a bracket, a clamp pivoted to the bracket and adapted for rocking movement relative thereto, said clamp having a rim engaging portion and means for locking said clamp in its operative position with respect to the supported rim.

19. A clamping device adapted for attachment to tire carriers, and having two opposed rim engaging portions adapted to engage the opposite edges of a supported rim, one of said rim engaging portions having secured thereto a horizontally spring pressed plunger adapted for yielding contact with the supported rim to prevent rattle thereof.

20. A tire carrier having a clamping device pivotally secured thereto and adapted for rocking motion transversely with respect to the tire carrier, said clamping device having rigid opposed rim engaging portions, one of said rim engaging portions having associated therewith a yieldable plunger engaging the supported rim, on the side thereof, to prevent rattle of the rim with respect to said rim engaging portions of the clamp.

In testimony whereof I affix my signature.
CHARLES H. NEHLS.